Patented July 9, 1935

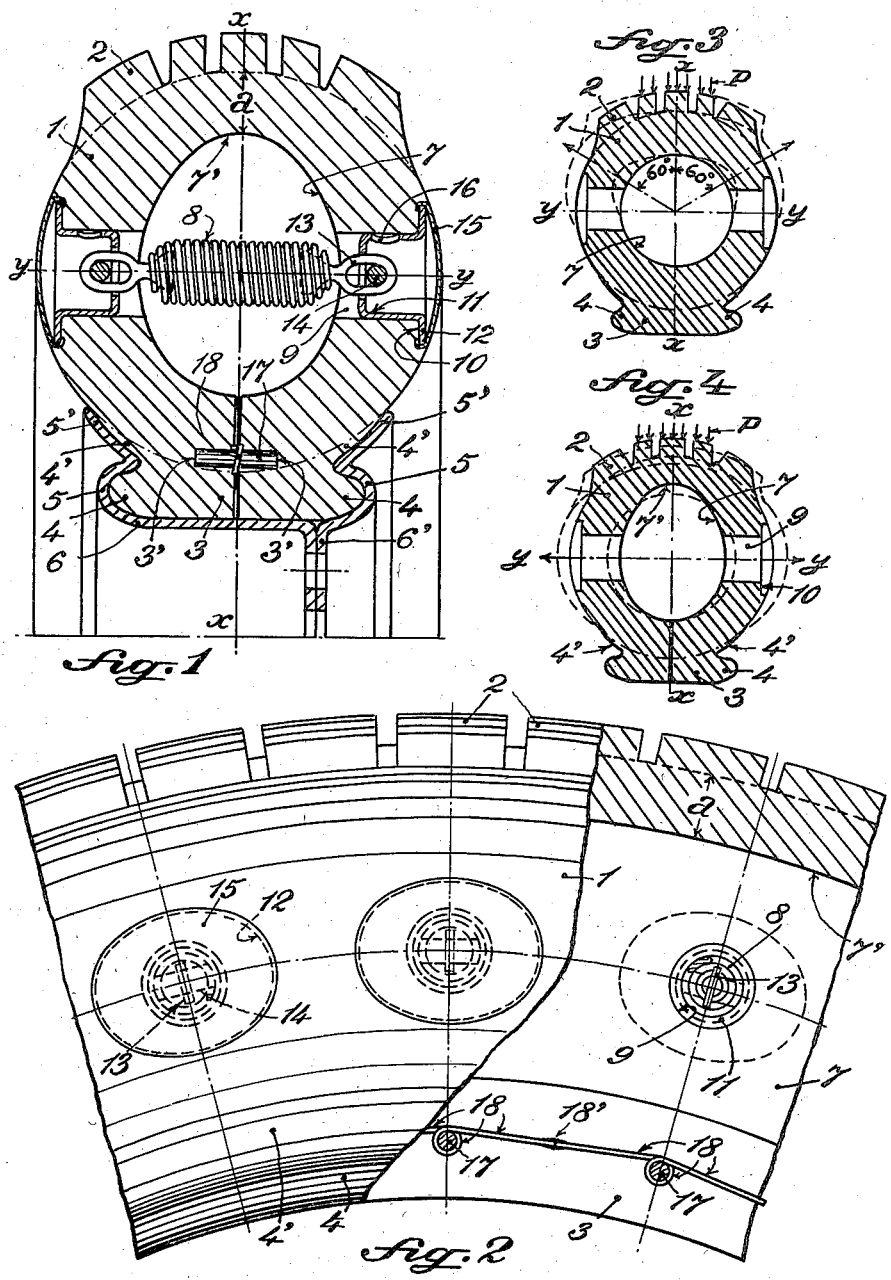

2,007,724

UNITED STATES PATENT OFFICE 2,007,724

TUBULAR RUBBER TIRE WITH METAL SPRINGS

Stefano Palli, Turin, Italy

Application September 11, 1933, Serial No. 689,000
In Italy September 17, 1932

4 Claims. (Cl. 152—8)

The subject of the present invention is a tubular rubber tire reinforced with metal springs for vehicle wheels in general and in particular for motor vehicle wheels, characterized substantially by the particular arrangement of the springs and the means for anchoring them to the tire and also by the particular conformation of the internal circumferential cavity of the said tire and the means for securing the tire to the motor vehicle wheel.

One embodiment of the subject of the invention is illustrated simply by way of example in the accompanying drawing in which:

Figure 1 shows the arrangement of the tire and the rim of the wheel in cross-section;

Figure 2 is an elevation of a portion of the tire with a part shown in section;

Figures 3 and 4 are diagrammatic views illustrating the mode of operation of the tire.

The tubular tire 1 made of rubber having a suitable degree of elasticity comprises at the periphery a tread or track surface 2 and towards the interior a securing base 3 cut into two parts along a section preferably made along the central plane $x$—$x$ of the tire. Cavities 3', 3' arranged opposite each other are provided all around in the two parts of the base for the purposes hereinafter specified. The two parts of the base 3 are provided with lugs 4 for anchoring to the attachment beaks 5 of the rim. The latter, for the purpose of mounting the tire in place, must be of the well known type formed of two parts, 6, 6' adapted to be coupled together by means of bolts or the like. These two parts may equally well be formed by the two halves of a wheel which can be coupled together by retaining means.

In this type of tire which is held in place simply by the clamping force of the two parts 6, 6' of the rim or of the wheel and not as in the usual pneumatic tires by the pressure of the internal air, there is always a possible danger that the tire will be torn from the rim by the action of centrifugal force which tends to cause it to expand, and as a result of forces exerted in an axial direction. Further it can become worn where it touches the ends of the securing beaks 5.

In order to obviate this two-fold disadvantage the two reinforcements 4' are provided near the base of the tire and are adapted to press upon arcuate extensions 5' of the securing beaks 5 of the rim forming a kind of cradle. The tire with the said reinforcements 4' rests upon this cradle both under the action of radial stresses whereby wear is avoided, and under the action of axial forces, whereby it is prevented from becoming torn off. In addition metal pins 17 are inserted in the plurality of transverse cavities 3', 3' of the two parts of the base. These pins 17 are connected together by means of an annular ligature formed by a wire or a metal cable 18 twisted around the said pins 17 and the two ends of which are connected together for example by welding or soldering 18 (see Figure 2).

The arrangement formed by the pins 17 anchored to the base 3 and the annular ligature 18 which connects them together forms a frame which opposes any expansion of the tire and consequently keeps it anchored to the wheel.

The effective cross-section of the tire is substantially circular as will be seen in Figure 1 from the dot and dash line which completes the full lines of the two side pieces, because in fact neither the tread 2 which is provided with deep curves with a view to increasing the adherence with the crown nor the securing base 3 will provide an effective elastic support for the load acting upon the tire.

The tire comprises internally a circumferential cavity 7, the cross-section of which is preferably ovoidal, arranged with its longer axis in alignment with the radial axis $x$—$x$ of the cross-section of the tire and with its apex 7' which has the smaller radius of curvature situated towards the periphery of the tire itself. This arrangement is adopted in order that the upper half of the tire which is formed by a strong arc-shaped section will have a thickness $a$ which is a minimum at the apex and increases gradually towards the sides. This minimum thickness $a$ is made greater in proportion as the load to be carried by the tire increases and comparatively it is made smaller when the degree of elasticity required for the tire increases.

The section of the cavity 7 may equally well be elliptical.

According to the present invention the tire is reinforced internally with a plurality of steel wire coil springs 8 arranged along the transverse axis $y$—$y$ of the cross-section of the tire and consequently situated parallel to the axis of the annular arrangement formed by the tire. These springs 8 having their ends provided with the usual attachment yokes 13, are anchored to the sides of the tire in which transverse and co-axial pairs of holes 9 are provided for this purpose, which holes lead into the interior of the cavity 7 and terminate on the sides of the tire in mortices 10. In each hole 9 is fitted a pressed metal cup 11 provided with a large flange 12 which bears upon the base of the mortices 10. The yokes 13 pass through the base of the cup which is pierced with a hole and are anchored upon this base by means of an ordinary pin 14. The springs are thus anchored to the sides of the tire in an effective manner and the tension of the springs is uniformly distributed upon the said sides by means of the large flanges 12 which are preferably oval or elliptical and are arranged with their longer axis in the circumferential direction (see Figure 2).

The cavity of the cups 11 is preferably closed by means of a cover 15 hooked to the flange 12 in order to prevent the entry of dust and mud, while a lateral hole 16 is provided in the cup 11 for the insertion of the pin 14.

The operation is as follows:—

Under the action of the load P (see Figure 4) the tire is crushed in the radial direction of the axis $x$—$x$ and consequently in view of the shape and arrangement of the internal cavity 7 the tire becomes enlarged in a transverse direction and adopts a substantially elliptical shape, as shown in dotted lines the longer axis of the ellipse coinciding with the axis $y$—$y$.

Consequently the springs 8 are tensioned and co-operate effectively in conjunction with the elastic reaction of the material from which the tire is formed, so as to support the load. By arranging the springs 8 sufficiently close to each other, three springs at least of the arrangement of springs 8 will operate effectively in the zone over which the load P exerts its action.

On account of the assistance provided by the springs 8 the degree of compactness or hardness of the tire may be made relatively low, either by limiting the amount of material, that is to say by making the internal hole 7 of large size, or by employing more elastic material. All this assists in reducing the weight of the tire and increasing its elastic capacity for yielding to obstacles.

The whole of the foregoing effects are however obtained only on condition that the shape of the internal cavity 7 is oval or elliptical as described above and that the upper resisting arc has a minimum thickness $a$ at the apex.

If the cross-section of the cavity 8 were for example circular and concentric with respect to the useful section of the tire, as shown diagrammatically in Figure 3, the upper resisting arc having a constant thickness would have a tendency under the action of the load P, like any fully closed arc, to deform preferably in two directions making an angle of substantially 60° with the central axis $x$—$x$. Consequently the springs 8 could not co-operate in supporting the load, that is to say, that the entire internal elastic reinforcement formed by the springs 8 would be completely ineffective.

The tire may undergo numerous modifications from the point of view of construction without on that account going outside the scope of the invention.

What I claim is:—

1. A tubular rubber tire for vehicle wheels in general and motor vehicle wheels in particular, comprising lugs for the attachment of the tire to the rim of the wheel having a detachable flange, said tire having an elastic support formed by a plurality of spaced coil springs arranged transversely within the internal cavity of the tire and parallel to the axis of rotation of the tire, and, said tire having pairs of transverse coaxial holes leading into the interior of the internal circumferential cavity thereof and provided externally upon the sides of the tire with an enlarged mortice, a metallic cup inserted in each transverse hole and having a flange bearing upon the base of said mortice, a pin in the base of each cup, and a yoke at each end of each spring cooperating with said pin whereby said springs are anchored in place in the tire.

2. A tubular tire according to claim 1, the mortice and the flange of the said cup being oval in shape and having their longer axis arranged in the circumferential direction of the tire.

3. A tubular tire according to claim 1, the mortice and the flange of the said cup being oval in shape and having their longer axis arranged in the circumferential direction of the tire, the said cups being closed externally by means of a cap attachable to the flange of said cups and having a lateral hole for the insertion of the said pin.

4. A tubular tire according to claim 1, characterized by the feature that the securing base of the tire is cut into two parts provided all around with pairs of transverse cavities serving for the lodgment of metal pins connected together by an annular ligature made of metal wire or cable with a view to securing the tire to the wheel.

STEFANO PALLI.